March 3, 1936.  F. H. ADAMS  2,032,646
MULTIPLE SPINDLE HOBBING MACHINE
Filed Jan. 2, 1932   3 Sheets-Sheet 1

INVENTOR:
FRANK H. ADAMS
Kwis Hudson & Kent
ATTORNEYS

March 3, 1936.  F. H. ADAMS  2,032,646
MULTIPLE SPINDLE HOBBING MACHINE
Filed Jan. 2, 1932  3 Sheets-Sheet 2
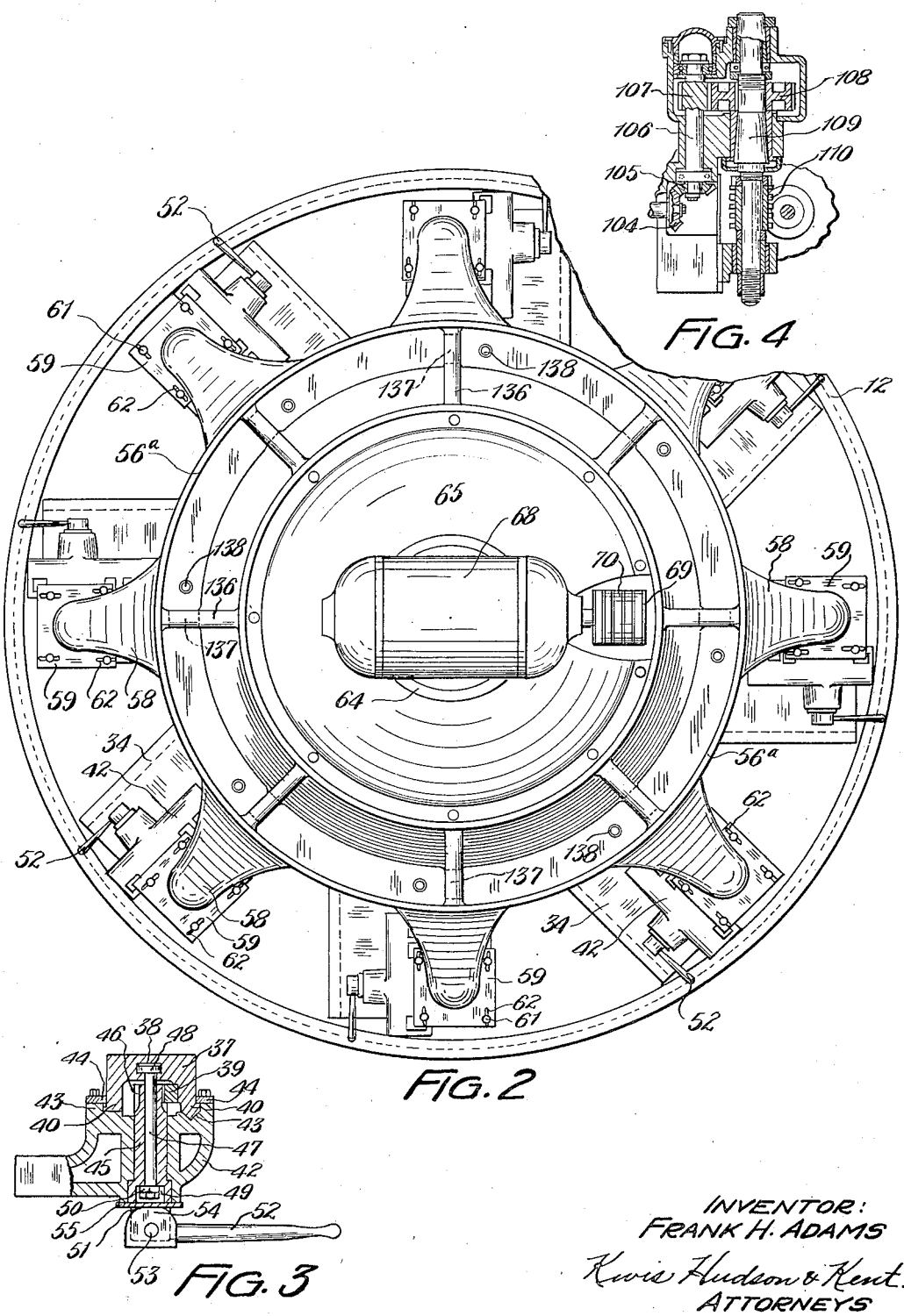
INVENTOR:
FRANK H. ADAMS
Kwis Hudson & Kent.
ATTORNEYS March 3, 1936.　　　　F. H. ADAMS　　　　2,032,646

MULTIPLE SPINDLE HOBBING MACHINE

Filed Jan. 2, 1932　　　　3 Sheets-Sheet 3

INVENTOR:
FRANK H. ADAMS
Kwis Hudson & Kent
ATTORNEYS

Patented Mar. 3, 1936

2,032,646

UNITED STATES PATENT OFFICE 2,032,646

MULTIPLE SPINDLE HOBBING MACHINE

Frank H. Adams, Cleveland Heights, Ohio, assignor to The Cleveland Hobbing Machine Company, Cleveland, Ohio, a corporation of Ohio Application January 2, 1932, Serial No. 584,393

4 Claims. (Cl. 90—4)

The present invention relates to a machine tool and particularly to a multiple spindle machine in which a series of machining units are mounted to travel in an endless path, moving past the operator's station where finished articles are removed and blanks to be machined are inserted, the individual units being so operated and controlled during their travel in said endless path, that the operation on each blank is completed during the travel of the unit from and to the operator's station.

An object of the invention is to provide a continuously operating machine of the character specified which is of simplified and improved construction.

A further object is to provide a machine of the character specified which is so constructed that the parts thereof will be subjected to a minimum amount of wear, particularly the feed cam of the machine, thus reducing to a minimum the necessity of replacing any operative parts of the machine and resulting in lessening the cost of operating the machine.

Another object is to provide, in a machine of the character specified, means for imparting the required relative feeding movements to the tools and blanks which is so arranged as not to be subjected to chips or other objects falling thereon which would render its action inaccurate.

A further object of the invention is to provide, in a machine of the character specified, improved means for supplying coolant to the tools and work during the cutting operation.

Additional and further objects and advantages of the invention will become apparent hereinafter during the following detailed description of several embodiments thereof.

The following description and accompanying drawings set forth in detail certain mechanical embodiments of the invention, the disclosed embodiments constituting but several of the various mechanical forms in which the invention may be embodied.

Referring to the accompanying drawings, forming a part of this specification:

Fig. 2 is a fragmentary top plan view of the machine shown in Fig. 1;

Fig. 3 is a sectional view taken substantially on line 3—3 of Fig. 1, looking in the direction of the arrows;

Fig. 4 is a sectional view through the tool head and is taken substantially on line 4—4 of Fig. 1, looking in the direction of the arrows;

Figure 1:
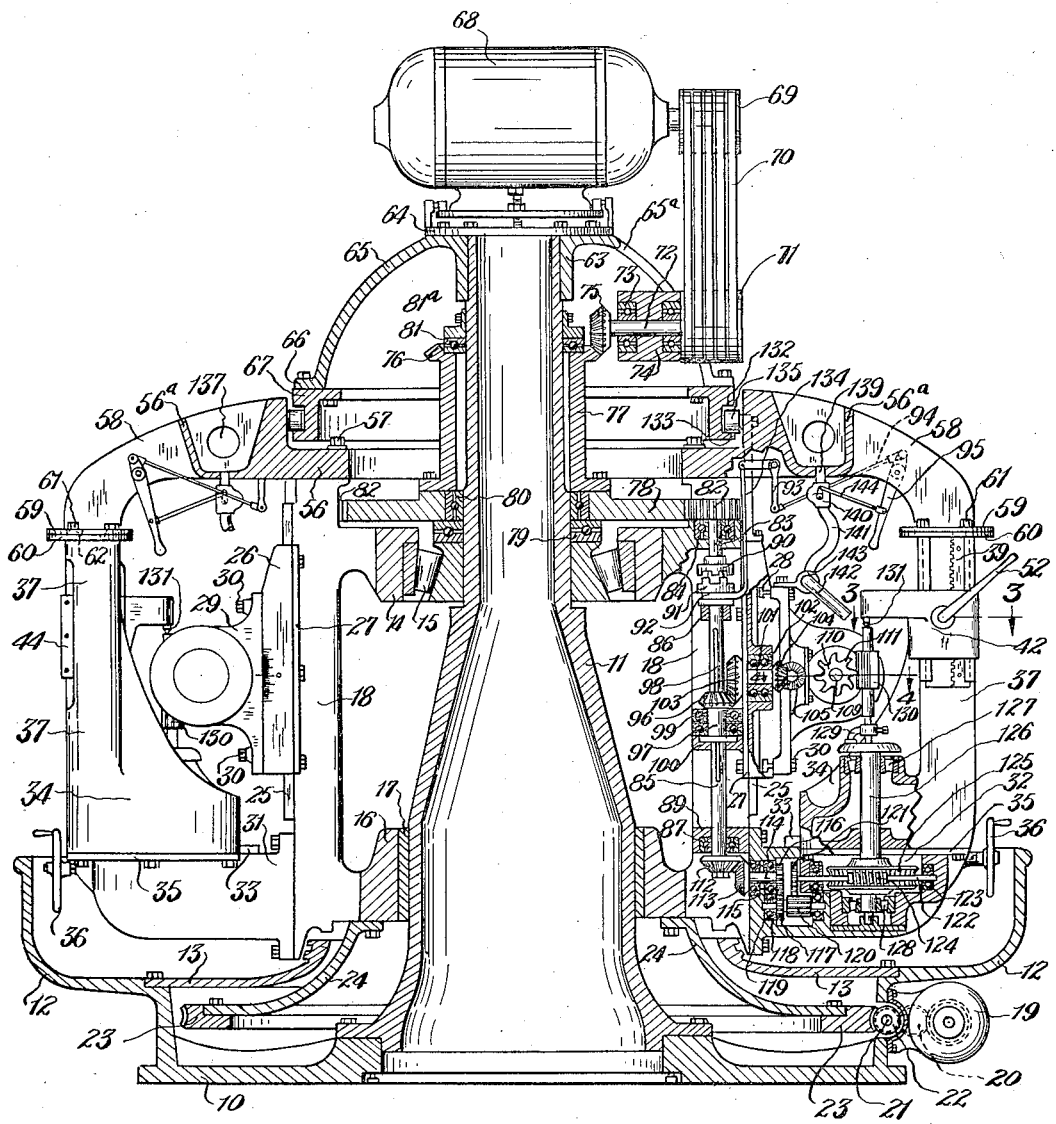
Figure 1 is a view of a machine embodying the invention, partly in axial section and partly in elevation, one of the machine units being shown in section and another being shown in elevation.

In the accompanying drawings, the invention is shown applied to a multiple spindle hobbing machine in which a series of separate hobbing units are carried by a rotary turret mounted upon a fixed base and is similar in certain particulars and in its mode of operation to the machine disclosed and described in the Sommer and Adams Patent No. 1,732,700, of October 22, 1929, the machine embodying the present invention being an improvement upon the machine disclosed in said patent.

The entire machine is mounted and supported upon a fixed circular base 10 having rigidly secured thereto at its center a vertical hollow post 11. The base 10 has an outwardly and upwardly extending circular flange 12 which, with a ring plate 13 secured thereto and of substantially truncated conical formation adjacent its central opening, forms a drip pan to catch any lubricant or coolant dripping from the mechanism above it.

A rotary turret, preferably formed in a single casting, is mounted upon the post 11 and comprises a bearing sleeve 14 adjacent the upper end of the turret rotatably mounted and supported upon a tapered bearing 15 arranged upon the reduced upper portion of the post 11 and a second bearing sleeve 16 adjacent the lower end of the turret and rotatably mounted upon the enlarged lower end of the post 11, a bearing bushing 17 being interposed between the sleeve 16 and the post 11. The sleeves 14 and 16 are connected with a vertically extending circular portion 18 having vertically extending guideways 25 (later to be referred to) arranged therein in circumferentially spaced pairs, there being, in the present instance, eight pairs of guideways 25, since the machine illustrated is an eight spindle machine, it being understood, however, that the number of pairs of guideways 25 will vary in machines having a different number of spindles.

The turret is rotated about the post 11 by means of an electric motor 19 bolted or otherwise secured to the outer side of the base 10 and operatively connected through gearing 20 to a worm shaft 21 rotatably supported in the base in any suitable or desirable manner and extending in a direction substantially tangential thereto and provided with a worm 22. The worm 22 meshes with a large worm wheel 23 arranged within the base 10 and supported by and connected with the bearing sleeve 16 of the turret by means of a ring plate 24 of substantially upwardly extending truncated conical configuration and surrounding in spaced relation the lower end of the post 11.

The circular portion 18 of the turret is provided with pairs of vertical ways 25, as previously mentioned, upon which tool head supporting slides 26 are mounted and held in place by gibs 27, as is well understood in the art. The tool head supporting slides 26 are provided with circular T-slots 28 for the purpose of receiving the heads of T-bolts carried by the tool head 29, such T-bolts being provided with nuts 30 whereby the tool head 29 can be rotated upon the slide 26 and clamped in the desired position by tightening the nuts 30 to give the proper angular adjustment to the tool spindle.

Secured to the lower end of the vertically extending portion 18 beneath each pair of ways 25 are brackets 31, such brackets projecting laterally of the portion 18 in a radial direction with respect to the machine and being provided with suitable recesses 32 forming gear housings and within which gearing, later to be referred to, can be mounted. The upper sides of the brackets 31 are provided with spaced ways 33 upon which the work heads 34 are slidably mounted and held in position by gibs 35. The work heads 34 may be adjusted inwardly and outwardly of the brackets 31 and any suitable means for so moving the work heads may be provided, such as the hand wheel 36 shown in the drawings. The wheel 36 may be fixed upon a threaded shaft rotatably mounted in the bracket 31 and engaging a fixed nut carried by the work head, but such construction has not been illustrated herein since it forms no part of the present invention.

Each work head 34 has a vertically extending post 37 at the outer side thereof and each post for a portion of its length is in the form of a lateral facing channel having a T-shaped slot 38 formed along the bottom of the channel. A rack bar 39 is secured within the channel of each post 37 against one of the side flanges thereof and each of the flanges of the post has a laterally projecting rib 40, while one of the flanges is provided with a tapered edge 41. A tail stock 42 is slidably mounted upon each of the posts 37 on the side thereof toward which the channel faces, each tail stock having ribs 43 overlying the edges of the ribs 40 of the post and being provided with a vertical tapered groove to receive the tapered edge 41 of the post. The tail stock is retained on the post by means of gibs 44 secured to the ribs 43 of the tail stock and overlying the inner sides of the ribs 40 of the post.

A hollow horizontal shaft 45 extends through the tail stock into the channel of the post and has its inner end milled to provide a gear 46 which meshes with the rack 39 within the channel of the post. A bolt 47 is mounted within the hollow shaft 45 and extends beyond the inner end thereof and has a T-head 48 which slides in the T-groove 38 in the post 37. The outer end of the shaft 45 has a counterbore 49 in which the outer end of the bolt 47 lies and the bolt 47 is secured to the shaft by means of nuts 50 on the end thereof within the counterbore 49. The hollow shaft 45 projects beyond the outer face of the tail stock, such projecting end being provided with a transverse slot 51 within which a lever 52 is pivotally connected to the shaft by a transverse pivot pin 53. The inner end of the lever 52 has a cam 54 thereon which acts against a bearing plate 55 which rests upon the outer face of the tail stock and extends through the slot 51 of the shaft. When the lever 52 is in the position at right angles to the shaft 45, as shown in Fig. 3, it may be used as a crank to turn the shaft 45 and through the rack 39 and pinion 46, to shift the tail stock upwardly or downwardly upon the post 37. When the lever 52 is swung outwardly from the position shown in Fig. 3, the cam 54 engages the plate 55 and pulls the shaft 45 outwardly and with it the bolt 47, causing the tail stock to be pressed tightly against the post 37 so that it will be rigidly held in the position to which it has been adjusted.

A member, which may be termed the upper turret and which is preferably formed of a single casting, comprises a ring 56 surrounding the reduced upper end of the post 11 and resting upon and secured to the upper end of the vertically extending portion 18 of the turret by suitable securing means, such as bolts and nuts, indicated at 57. A circular trough 56ª, later to be referred to, is carried by the ring 56, being spaced laterally thereof, while extending radially from the trough 56ª and spaced circumferentially thereof are arms 58, there being eight of these arms in the present instance, which arms have downwardly extending portions at their outer ends provided with plates 59 which are clamped to plates 60 arranged at the upper ends of the post 37 by means of clamping bolts 61 extending through elongated slots 62 in the plate 59 and into the plate 60. The purpose of providing the slots 62 is, of course, to allow the work heads 34 to be adjusted inwardly or outwardly upon the brackets 31, it being understood that the bolts 61 are loosened prior to such adjustment and then tightened to again rigidly connect the plates 59 and 60.

The upper end of the post 11 supports a substantially dome-shaped member, preferably in the form of a single casting and comprising a sleeve 63 telescoped upon the end of the post 11, the lower end of the sleeve abutting a shoulder on the post, and having a plate 64 integral with or secured thereto bearing upon the end of the post 11. The dome portion 65 of the member extends outwardly and downwardly from the sleeve 63 and plate 64, it being noted that the lower end of such portion is provided with a foot portion 66 connected to and supporting a ring 67 located above and spaced from the ring 56.

An electric motor 68 is mounted and secured in any desired manner upon the upper side of the plate 64, while a pulley 69, fixed on the shaft of this motor, is connected by a belt or other suitable form of connection 70 to a pulley 71 fixed on a shaft 72 extending radially inwardly of the machine through an opening 65ª in the portion 65 and rotatably supported in bearings 73 mounted in bearing blocks 74 suitably carried by the dome portion 65.

The inner end of the shaft 72 has fixed thereon a bevel pinion 75 meshing with a bevel gear 76 arranged at the upper end of a sleeve 77 and either integral therewith or connected thereto, such sleeve 77 being rotatably supported upon the post 11 and extending through the central openings in the rings 67 and 56 and having secured to its lower end a large spur gear 78 located above the bearing sleeve 14 of the turret and surrounded by the portion 18 of the turret, as shown in Fig. 1. A thrust bearing 79 is arranged beneath the gear 78 while a bearing 80 is located beneath the sleeve 77 and between the gear 78 and the post 11. Another bearing, indicated at 81, is arranged between the upper end of the sleeve 77, the bevel gear 76, an angle ring 81ª secured to the post 11, and the post 11, this latter bearing serving as a thrust bearing resisting upward thrust of the sleeve 77.

The large spur gear 78 meshes with a plurality of smaller spur gears 82 (in this instance eight) fixed upon the upper ends of vertically extending shafts 83 rotatably mounted in bearings 84 carried by the portion 18 of the turret, the shafts 83 extending downwardly of the portion 18 and each located between a pair of ways 25. Shaft 85 axially aligned with the shafts 83 and having their upper ends interfitting with the shafts 83 but rotatable independently thereof, are mounted in blocks 86 in the portion 18 and adjacent its upper end and in bearings 87 carried by blocks 89 also in the portion 18 and adjacent the lower end of the shafts 85. The shafts 83 are arranged to be connected to and disconnected from the shafts 85 to drive the latter by means of clutches, the fixed elements 90 of which are carried by the shafts 83 while the shiftable elements 91 are slidable upon and rotatable with the shafts 85.

Clutch shifting yokes 92 are operatively connected with the shiftable clutch elements 91, as is well understood, and have upwardly extending arms pivotally connected to bell-crank levers 93 pivoted to the arms 58. The bell-crank levers 93 have pivotally connected thereto one end of links 94, the opposite ends of which are pivoted to operating levers 95 pivotally mounted upon the arms 58. It will be seen that when the operating levers 95 are moved in the proper direction the shiftable clutch elements 91 will be moved into clutching engagement with the fixed clutch elements 90, through the mechanism just described, and that the shafts 83 and 85 will then be operatively connected and will rotate together. Bevel gears 96 are carried at the upper ends of sleeves 97 slidably keyed upon the shafts 85 by means of the keys 98 and are rotatably supported in bearings 99 carried by brackets 100 extending inwardly from the tool slides 26 between the ways 25.

Inwardly extending shafts 101 are rotatably mounted in bearings 102 carried by the tool slides 26 and have at their inner ends bevel gears 103 fixed thereto and meshing with the bevel gears 96. The outer ends of the shafts 101 have fixed thereto bevel pinions 104 which constantly mesh with bevel gears 105 fixed on the ends of shafts 106 extending horizontally and at right angles to the shafts 101 and rotatably supported in the work head 29. Since the gears 105 and 104 are bevel gears, it will be seen that the tool head 29 can be rotated upon the tool head slide 26 to angularly adjust the tool spindle. The shafts 106 adjacent their opposite ends have fixed thereon spur gears 107 which mesh with spur gears 108 fixed on tool spindles 109 extending parallel to the shafts 106, but spaced outwardly therefrom in the tool heads, the spindles 109 being supported in suitable bearings formed in the tool heads and adapted to have suitable tools or cutters 110 fixedly arranged thereon in any suitable manner, as is well understood in the art, which tools or cutters may be in the form of hobs 111 as shown in Fig. 1.

The means by which the tool or cutter spindles may be driven from the motor 68 having now been described, the drive for the work spindles will now be explained. The lower ends of the shafts 85 have fixed thereto bevel pinions 112 which mesh with bevel pinions 113 fixed on the inner ends of short shafts 114 rotatably mounted in bearings 115 arranged in the brackets 31, the shafts 114 having fixed thereto at their outer ends spur gears 116. The spur gears 116 constantly mesh with spur gears 117 fixed on shafts 118 extending parallel to the shafts 114, but below the same and rotatably supported in the brackets 31 in bearings 119. The shafts 118 also have fixed thereon, outwardly of the gears 117, elongated spur gears 120 meshing with spur gears 121 fixed on worm shafts 122 rotatably mounted in bearings 123 carried by downwardly extending portions of the work heads and arranged in the recesses 32 in the brackets 31.

The worm shafts 122 extend parallel to the shafts 114 and 118 and since the spur gears 121 carried thereby mesh with the elongated spur gears 120, it will be seen that the work heads 34 can be adjusted radially inwardly and outwardly of the machine without disengaging the gears 120 and 121 and breaking the driving connection between the shafts 122 and the shafts 85. The worm shafts 122 have fixed thereon, intermediate their ends, worms 124 which mesh with worm wheels 125 fixed on the vertically extending work spindles 126, which spindles are rotatably mounted adjacent their opposite ends in tapered bearings 127 and 128 carried by the work heads. The upper ends of the work spindles 126 are provided with suitable work holding chucks, such as tapered socket chucks, the details of which need not be shown herein since the same are well understood in the art; work engaging dogs 129 also being provided at the upper ends of the work spindles for the purpose of more securely connecting the work blanks to the spindles. The work is indicated at 130, it being noted that the upper end of the work is engaged by the pointed tail stock center 131.

In the cutting operation of the tools upon the work blanks it is, of course, understood that in addition to the relative rotational movements imparted to the tool and the work spindles there must be imparted thereto a relative linear feeding movement and to this end the tool heads 29 have been mounted upon the tool head supporting slides 26 in order to impart the desired feeding movements to the tools in the tool spindles.

The ring 67, previously referred to, is provided in its outer periphery with a groove 132 extending circumferentially thereof and having its lowermost wall in the form of a cam surface or track constituting a feed cam 133 and designed so that the tool heads will be properly moved to impart the desired feeding movement to the tools carried thereby, the cam surface also having portions providing for dwell and a complete separation and bringing together of the tools and work, as is well understood. The tool head supporting slides 26 are operatively associated with the feed cam 133 by means of vertically extending arms 134, the lower ends of which are bolted or otherwise secured to the tops of the slides 26 while the upper ends thereof rotatably support rollers 135 arranged in the groove 132 to roll on the cam surface thereof. Since the turret is rotatable upon the post 11 and the ring 67 is nonrotatably supported thereon, it will be seen that the turret will rotate about the ring during the operation of the machine and the rollers 135 will travel along the surface of the feed cam 133 and through the arms 134 will cause the desired upward or downward movement of the tool head supporting slides 26.

It will be appreciated that in machine tools of this character, the operation of the tools upon the work causes a large amount of chips and filings and other abrasive articles to fall into the lower part of the machine. If the feed cam were arranged in the base of the machine, as for example in the manner shown in the Sommer and Adams Patent No. 1,732,700, hereinabove referred to, a substantial amount of this material would fall upon the cam and the movement of the feed rollers along the cam surface would soon act to destroy the accuracy of such surface and would necessitate the replacement of the feed cam with a new and accurate cam. Furthermore, the rollers passing over the chips or other objects would cause the relative feeding movement between the tools and work to be altered and inaccurate and unsatisfactory work would result. However, when the feed cam is arranged as in the machine embodying the present invention, such cam, being at the upper part of the machine, will not be subjected to the wearing action of any foreign matter thereon and the life of the cam will be indefinite while there will be no danger of chips on the cam changing the desired feeding movement. This is an extremely important feature of the present invention as the accurate designing and constructing of a feed cam for a machine such as disclosed herein entails large expense and considerable time aside from the fact that considerable unsatisfactory work might be produced by the changes occurring in the feeding movement.

In order to provide an efficient means for supplying coolant to the tools and work the upper turret of the machine is provided with the circular trough 56a, previously referred to, reenforcing ribs or webs 136 extending transversely of the trough adjacent each of the arms 58 and provided with openings 137 so that all parts of the trough will be connected. It is contemplated to maintain the trough 56a full of a suitable coolant supplied thereto in any desired manner. When the machine is used in a plant equipped with a central coolant supplying and circulating system the coolant will be supplied to the trough from such system, while if the machine is used in a plant not so equipped the trough can be kept filled with coolant in any desired way, the coolant which passes over the tools and work and drips into the drip pan 12 may be pumped back into the trough 56a by a suitable pump operatively connected with the motor 19, or with an independent motor.

The bottom of the trough is provided with a plurality of openings 138 arranged adjacent each of the arms 58, such openings each being provided with a downwardly extending pipe fitting 139 having arranged thereon at its lower end suitable valves 140. The valves 140 have connected thereto flexible conduits 141 which in turn are connected to pipes 142 supported in brackets 143 secured to the tool heads 29. The valves 140 have their operating levers pivotally connected to links 144, which links are pivotally connected to the clutch operating levers 95. It will be seen that when the levers 95 are moved to engage the clutch elements 90 and 91 the valves 140 will be thrown open and coolant can then flow from the trough 56 through the valves, the flexible conduits 141, and the pipes 142 upon the tools and work. When the levers 95 are moved to disengage the clutch elements 90 and 91 and stop the relative rotation of the tools and work, the valves 140 will be closed and the flow of coolant will cease.

The operation of the machine disclosed in Figs. 1 to 4 inclusive will now be described. The work heads 34 will be adjusted to the desired radial position upon the ways 33, the nuts 61 being loosened during this adjustment, after which they will be tightened to rigidly connect the plates 59 and 60. The tool heads 29 will be rotated on the tool head slides 26 by loosening the bolts 30 and then be clamped in the proper position by tightening said bolts when the tool spindles 109 are adjusted to the desired angular position. It will be understood of course that each of the adjustments just above mentioned depends upon the character of the work and are for the purpose of obtaining the desired cutting relationship between the tools and work.

Suitable tools or cutters being mounted on the tool spindles 109, the operator of the machine at the loading station (that point where the tools and blanks are separated) mounts a work blank in the chuck of the work spindle 126 of the unit that is at the loading station, and adjusts the tail stock 42 in the manner previously described. The operator may then start the motor 19 and the turret will commence its slow rotating movement. At the same time, the motor 68 being in operation, the operator will throw in the clutch of the unit by means of the lever 95 to start the relative rotational movements of the tool and blank, it being understood that the gear trains to the tool spindle and the work spindle are in the correct ratio to impart the desired relative rotational movement to the tool and blank. Of course, as soon as the lever 95 has been actuated to engage the clutch, the valve 140 will be opened and coolant supplied to the tool and work.

When the next unit of the machine is at the loading station, the operator loads a blank in this unit, as previously described, it being understood that the clutch of the unit is disengaged so that the tool and work spindles are not rotating, and, after the loading operation, the operator actuates the lever 95 to engage the clutch and start the rotation of the tool and work spindles. This procedure is followed until all of the units have been loaded. As the turret moves around, the rollers 135, traveling along with the feed cam 133, cause the tool head supporting slides 26 of the units to first move downwardly to bring the tools or cutters into cutting relationship with the work blanks, and then to move gradually downwardly to effect the desired feeding movement of the cutters or tools relative to the blanks. The cam 133 is so designed that there will be a period of dwell as each work head reaches the end of the feeding movement, after which the tool head supporting slides will be quickly moved upwardly to disengage the tool or cutter from the work, the completion of this last movement occurring when the units reach the loading station, it being understood that the cam track has an elongated depressed portion at the loading station, as described in the previously referred to Sommer and Adams Patent No. 1,732,700.

The modified form of the machine, in most of its parts, is the same as the machine already described, and, therefore, such parts will not be specifically referred to in the description of the modified form of the machine.

In this modified form of machine, the sleeve 77 is provided at its lower end with a bevel gear 145 in place of the large spur gear 78 used in the previously described form. The bevel gear 145 meshes with pinions 146 fixed on shafts 147 mounted in the turret in suitable bearings and extending radially thereof. The outer ends of the shafts 147 have fixed thereon fixed clutch elements 148 with which movable clutch elements 149 can be engaged or disengaged. The movable clutch elements 149 are mounted on shafts 150 arranged in axial alignment with the shafts 147, the adjacent ends of the shafts 147 and 150 interfitting but being independently rotatable. The shafts 150 are supported in suitable bearings mounted in the turret and have at their outer ends bevel gears 151 meshing with bevel gears 152 fixed on vertically extending shafts 153 carried by the turret and corresponding to the shafts 85 in the previously described form. The shiftable clutch elements 149, slidable on the shaft 150 but rotatable therewith, are operatively connected with clutch shifting yokes 154 carried by levers 155 pivoted to brackets 156 carried by the turret, the free ends of such levers 155 being pivotally connected to links 157 which in turn are pivotally connected to the operating levers 95 that are pivoted on the arms 58, as in the machine previously described. The shafts 153, as already explained, correspond to the shafts 85 in the first described form, and have the sleeves 97 and the bevel gears 96 carried thereby slidably keyed upon the shafts by means of the keys 158, it being understood that the lower ends of the shafts 153 are provided with the bevel pinions 112 fixed thereon and meshing with the pinions 113 on the shafts 114, as in the form of machine previously described.

Figure 5:
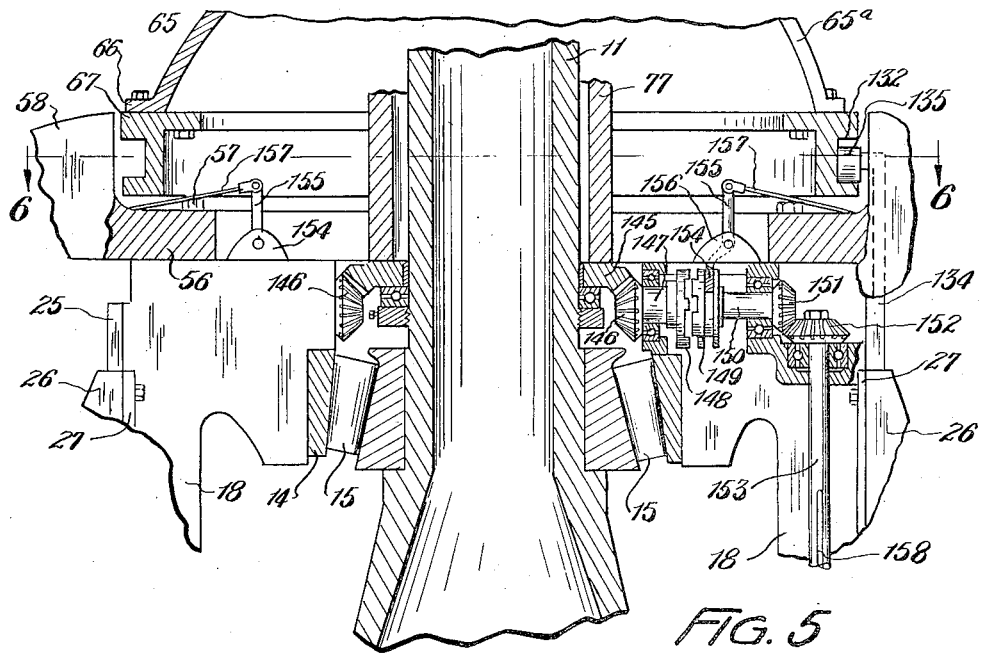
Fig. 5 is a fragmentary view of a modified form of the machine shown in Fig. 1 and discloses portions of the machine in section and other portions in elevation.
Figure 6:
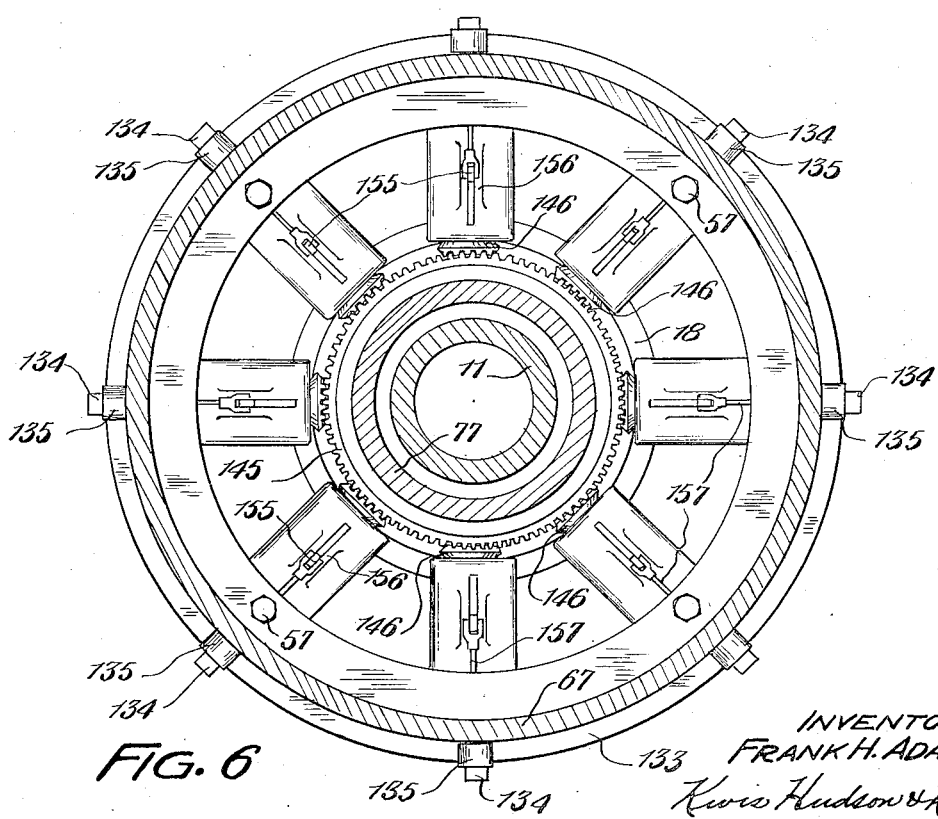
Fig. 6 is a transverse horizontal sectional view taken substantially on line 5—5 of Fig. 5, looking in the direction of the arrows.

The operation of the form of machine shown in Figs. 5 and 6 need not be described since it is the same as that of the machine shown in Figs. 1 to 4 inclusive, it being noted that the differences between the two forms of the machine reside in the driving train from the motor 68 to the tool and work spindles.

Although several preferred forms of the invention have been illustrated and described herein, it should be understood that the invention is susceptible of various modifications and adaptations within the scope of the appended claims.

Having thus described my invention, I claim:

1. In a machine of the character described, a base member, a turret rotatably mounted thereon, means for rotating the turret, a plurality of milling machines on the turret and each comprising a rotary work spindle and a rotary tool spindle, means for driving and controlling said tool spindles including clutches, a coolant trough arranged on said turret above said spindles, conduits extending from said trough to points adjacent said tool spindles, valves in said conduits, levers for operating said clutches, and connections between said valves and levers.

2. A gear cutting machine of the character described comprising a base member, a centrally disposed vertically extending post on said base member, a turret rotatably supported by said base, means mounted on said base member below said turret for rotating said turret, a stationary cam track supported on said post above said turret, a plurality of gear cutting units mounted on said turret, each of said gear cutting units comprising a work head and a tool head, a plurality of work spindles rotatably supported by said work heads, a plurality of tool spindles rotatably supported by said tool heads, means for slidably supporting said tool heads for vertical movement, means for operatively connecting said vertically movable tool heads with said cam track for moving said tool heads relative to said work heads upon rotation of said turret, and means mounted on said post above said turret for rotating said tool and work spindles of each unit at predetermined relative speeds.

3. A gear cutting machine of the character described comprising a base, a turret rotatably supported by said base, a plurality of gear cutting units supported by said turret, each of said gear cutting units comprising a rotatable tool spindle, means for rotating said tool spindle, conduits supported by said turret for conducting coolant fluid to a point adjacent said tool spindles, one of said tool spindles being associated with each of said conduits, and common means for controlling the flow of coolant fluid in said conduits and the rotation of the tool spindles with which they are associated.

4. A gear cutting machine of the character described, comprising a base, a turret rotatably supported by said base, a plurality of gear cutting units supported by said turret, each of said gear cutting units comprising a rotatable tool spindle, means for rotating said tool spindles, a plurality of clutches for connecting and disconnecting said tool spindles with said means, one of said clutches being associated with each of said tool spindles, conduits supported by said turret for conducting coolant fluid to a point adjacent said tool spindles, one of said conduits being associated with each of said tool spindles, a plurality of valves one in each of said conduits for controlling the flow of fluid in said conduits, and common means for actuating the clutch and valve associated with one of said tool spindles, whereby the flow of fluid is interrupted during the interval that the tool spindle is not connected with the means for rotating the same.

FRANK H. ADAMS.